June 14, 1960 W. R. LONG ET AL 2,940,615

TOBACCO HARVESTING DEVICE

Filed Dec. 19, 1956 9 Sheets-Sheet 1

INVENTORS
W.R. LONG &
P.J.T. RAWLINS
BY
ATTORNEYS

June 14, 1960 W. R. LONG ET AL 2,940,615

TOBACCO HARVESTING DEVICE

Filed Dec. 19, 1956 9 Sheets-Sheet 2

INVENTORS
W.R.LONG &
P.J.T.RAWLINS

BY [signature]
ATTORNEYS

June 14, 1960 W. R. LONG ET AL 2,940,615

TOBACCO HARVESTING DEVICE

Filed Dec. 19, 1956 9 Sheets-Sheet 3

INVENTORS
W. R. LONG &
P. J. T. RAWLINS
BY [signature]
ATTORNEY

TOBACCO HARVESTING DEVICE

Filed Dec. 19, 1956 9 Sheets-Sheet 4

INVENTORS
W.R. LONG &
P.J.T. RAWLINS

BY

ATTORNEY

June 14, 1960 W. R. LONG ET AL 2,940,615

TOBACCO HARVESTING DEVICE

Filed Dec. 19, 1956 9 Sheets-Sheet 5

INVENTORS
W. R. LONG &
P. J. T. RAWLINS

BY

ATTORNEY

June 14, 1960 W. R. LONG ET AL 2,940,615

TOBACCO HARVESTING DEVICE

Filed Dec. 19, 1956 9 Sheets-Sheet 6

INVENTORS

W.R.LONG &

P.J.T. RAWLINS

BY [signature]

ATTORNEY

INVENTORS
W. R. LONG &
P. J. T. RAWLINS
BY
ATTORNEY

TOBACCO HARVESTING DEVICE

Filed Dec. 19, 1956 9 Sheets-Sheet 8

INVENTORS
W. R. LONG &
P. J. T. RAWLINS
BY
A. Yates Dowell
ATTORNEY

June 14, 1960 W. R. LONG ET AL 2,940,615

TOBACCO HARVESTING DEVICE

Filed Dec. 19, 1956 9 Sheets-Sheet 9

INVENTORS
W.R.LONG &
P.J.T.RAWLINS

BY

[signature]
ATTORNEYS

United States Patent Office 2,940,615

Patented June 14, 1960

2,940,615

TOBACCO HARVESTING DEVICE

William R. Long and Philip J. T. Rawlins, Tarboro, N.C., assignors to Long Manufacturing Company, Tarboro, N.C.

Filed Dec. 19, 1956, Ser. No. 629,302

2 Claims. (Cl. 214—5.5)

Figures 1, 2:
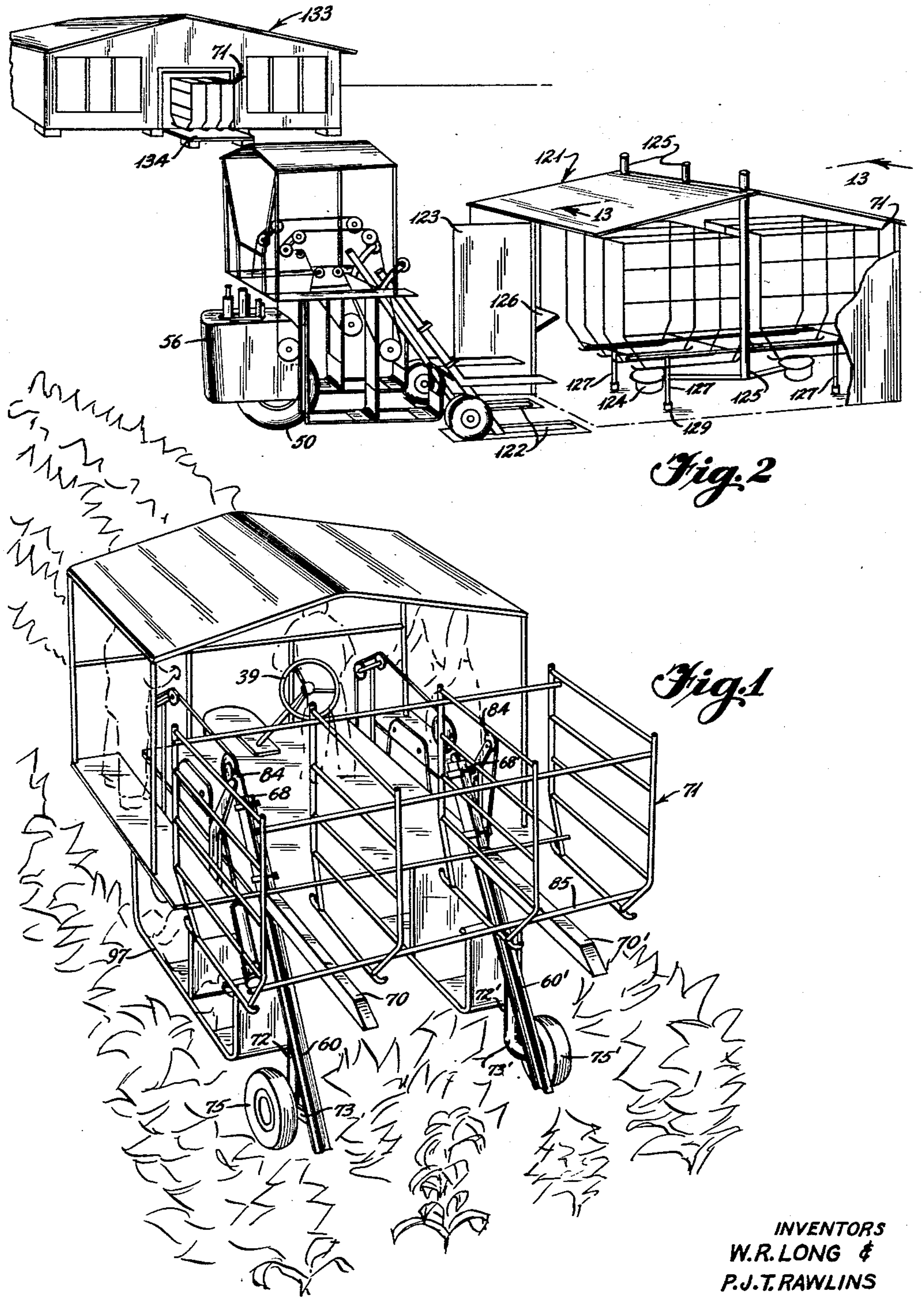

The present invention relates to equipment for handling and processing materials and more particularly to equipment and a process for handling tobacco from the fields in which it is grown to drying barns and to grading sheds.

Heretofore, tobacco has been harvested and cured by various processes and equipment which required large amounts of hand labor resulting in high costs of production with consequent small profits to the farmer. Although some improvement has been made in tobacco handling and harvesting equipment, notably by the harvester shown in the patent to William R. Long, No. 2,704,158, granted March 15, 1955, having worked out advantageously, it has been found that a large amount of manual handling is required to remove the filled sticks of tobacco from the racks fixed on the harvester and placing them in the drying barns. Heretofore, the handling of tobacco from the harvester has involved removing the filled sticks of tobacco from the rack fixed on the harvester and placing such filled sticks on the truck, driving the truck to a curing barn and placing the filled sticks in the curing barn. The procedure required an additional truck and a large amount of labor and time in filling the barn, thereby limiting the curing capacity of the barn because of the great amount of time, up to a day or more, required to fill the barn, during which time no tobacco could be dried. Also, a day or more was required to unload the barn and carry the sticks of cured tobacco to the grading shed. This manual loading of the curing barn was further delayed while waiting for the barn to cool after a cure was completed. The workers on the harvester who place the tobacco on the sticks are frequently overburdened and because of the limited space on the previous harvester it has not been possible to have two workers for each chain, and consequently the overall production of the harvester is limited and the workers picking the tobacco leaves cannot find empty clips on the conveyor on which to place the tobacco and must temporarily store the tobacco on their laps, causing discomfort and inconvenience, as well as the possibility of damage. An object of the present invention is to overcome the problems described above and to reduce the labor costs in harvesting, curing and grading tobacco.

Another object of the invention is to provide a tobacco harvesting vehicle with additional space for supporting the workers who loop tobacco on sticks, so that the driver of the vehicle may assist in this operation, and so that two more persons may be used for the looping operation, if necessary.

A further object is to provide equipment for handling the filled sticks of tobacco, so that further manual handling is not required after the looper places the tobacco on the rack.

A still further object is to provide a fork lift type of construction with a rack to cooperate with the fork lift so that the rack can be raised and lowered, and placed in a tobacco curing barn without manual handling.

Another object of the invention is to provide a general utility vehicle which may readily be converted into a tobacco harvester or into a tractor for drawing various types of implements, such as plows, harrows or the like, and to provide a three point suspension using parts of the elevating equipment to control the raising and lowering of implements.

A further object is to provide a fork lift vehicle of general utility for lifting and transporting equipment and also for lifting and elevating workers.

Another object of the invention is to provide a tobacco curing barn which may be quickly filled in a minimum of time, so that the barn may be used practically continuously for curing tobacco.

Figure 3:
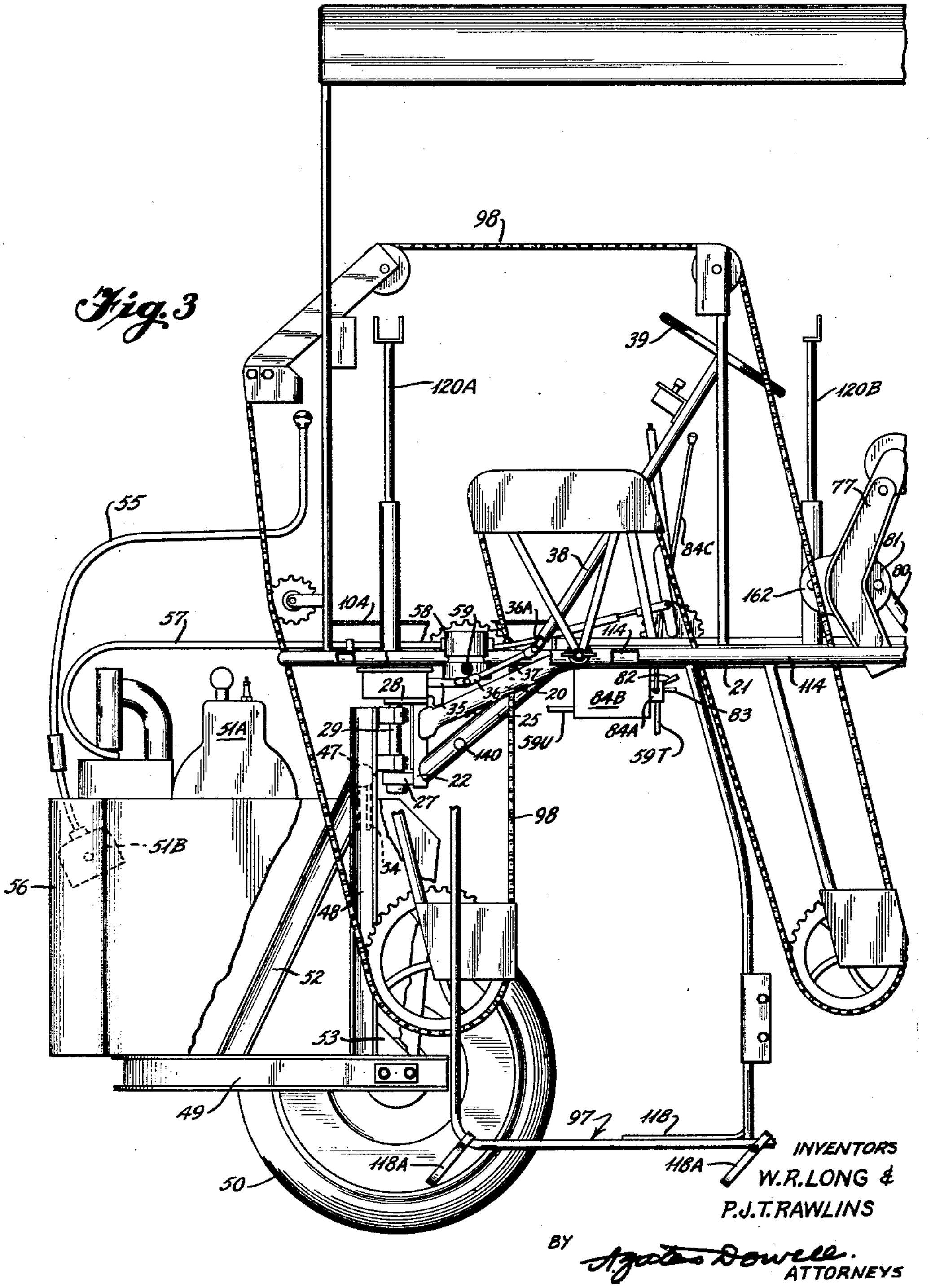
Figures 3A, 5:
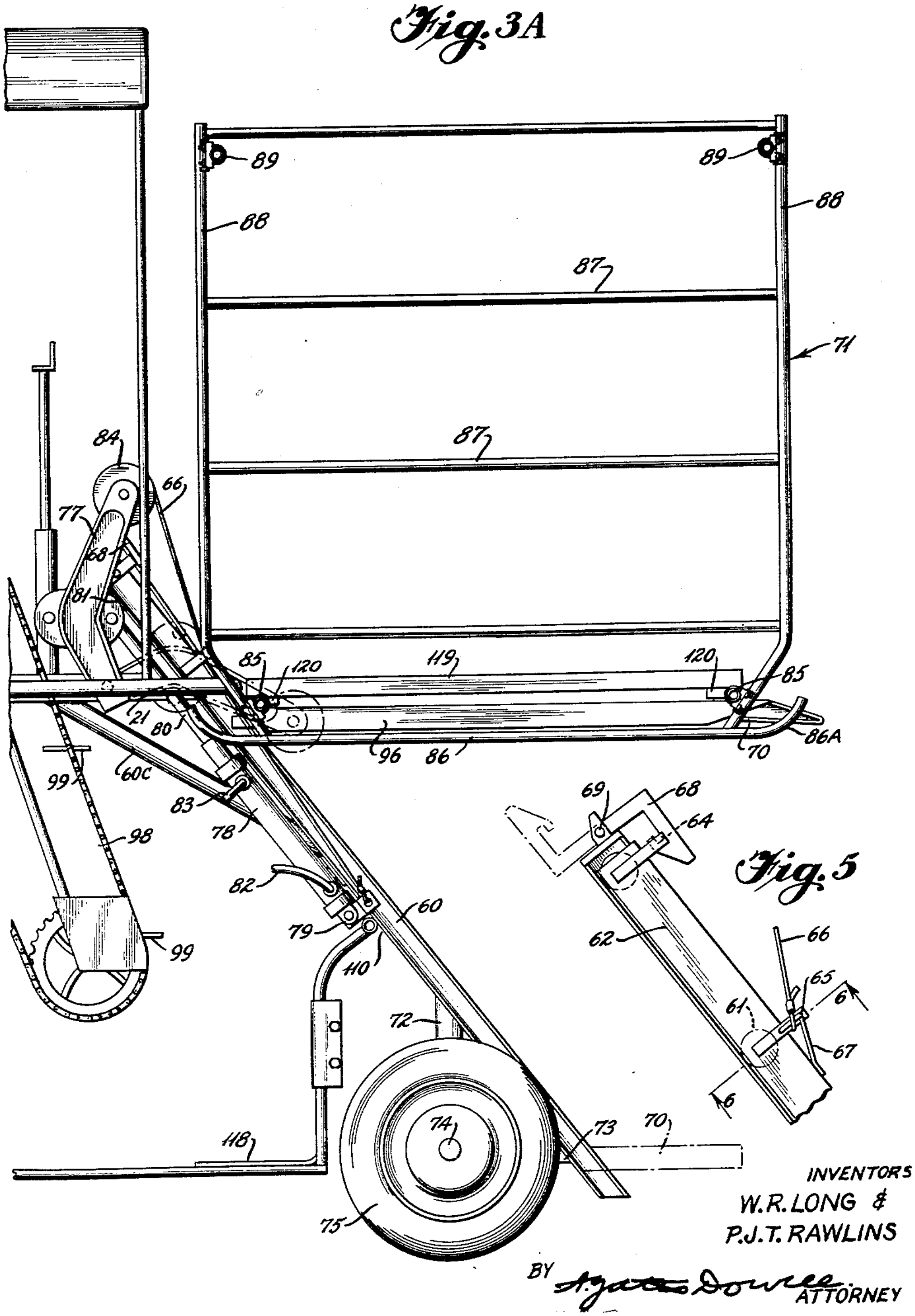
Figure 4:
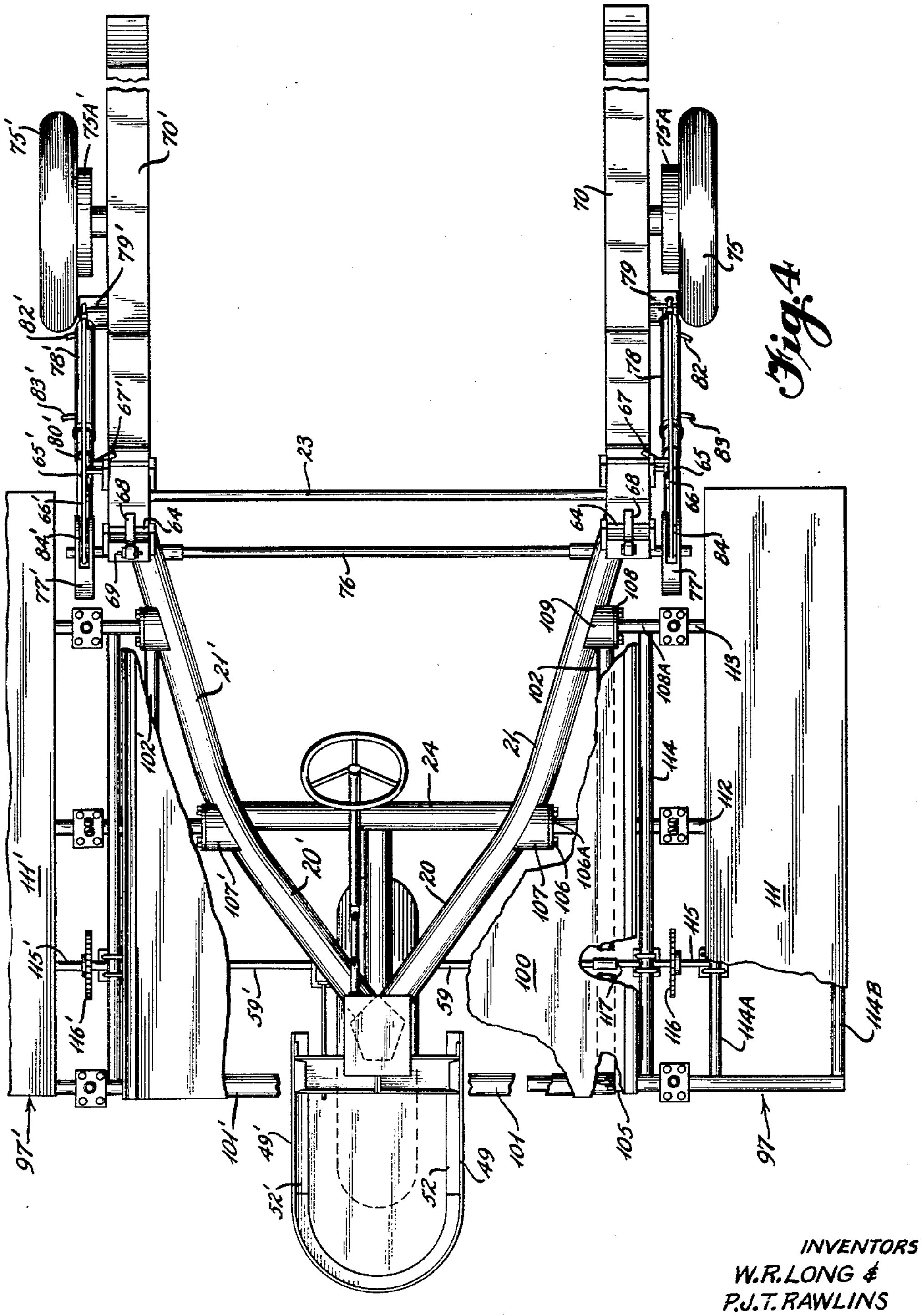
Figures 6, 7, 12:
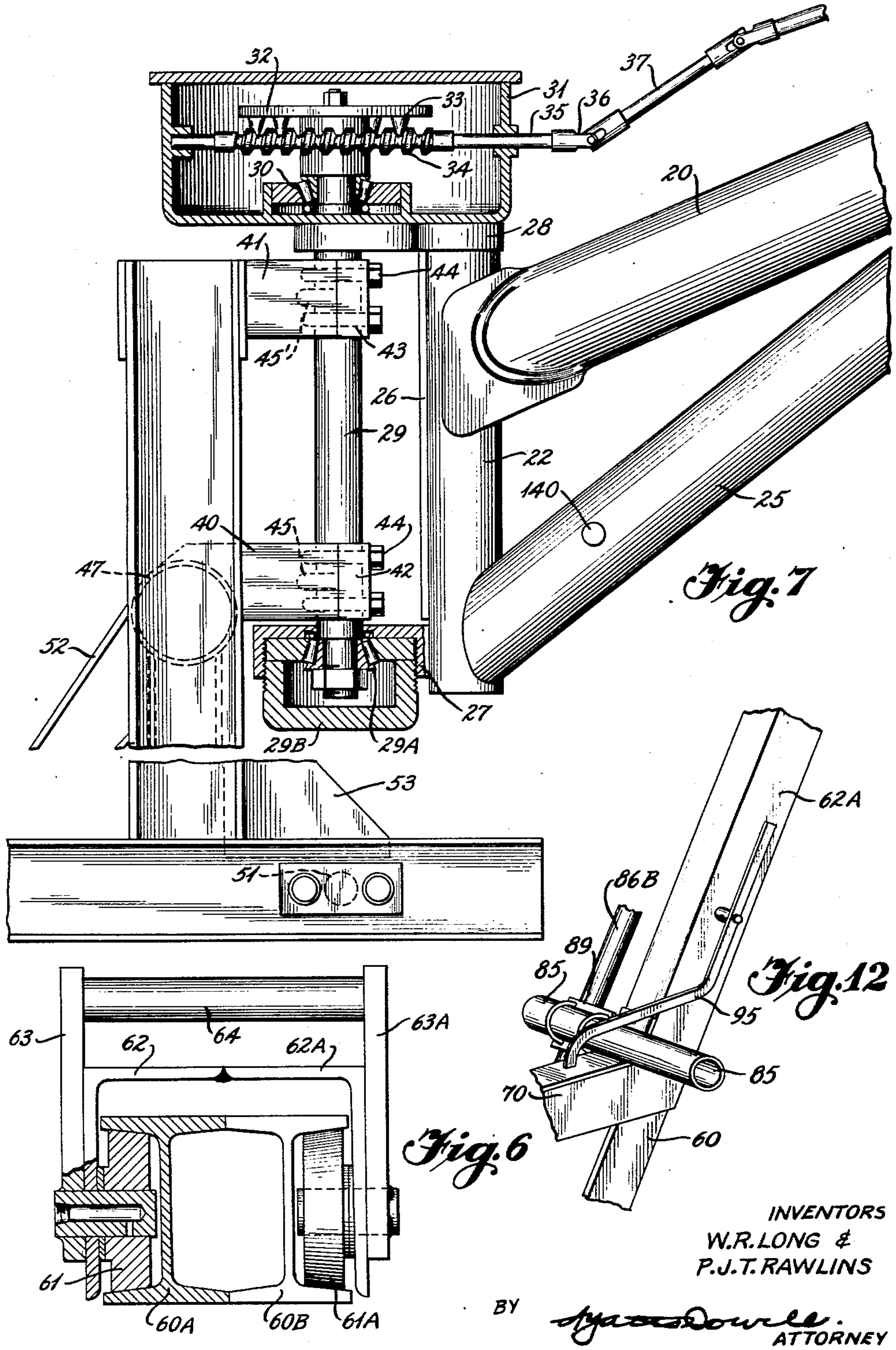
Figure 8:
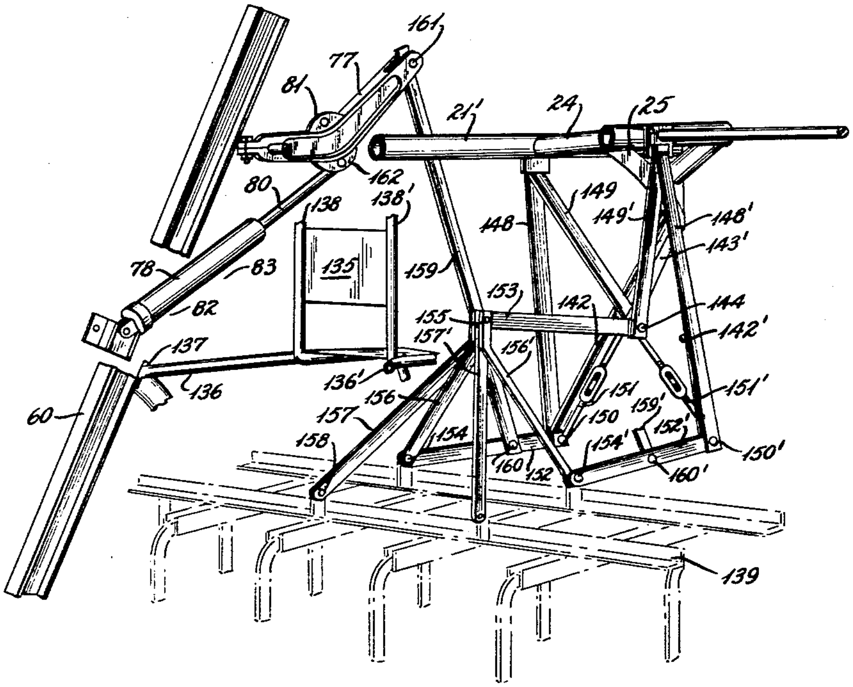
Figure 9:
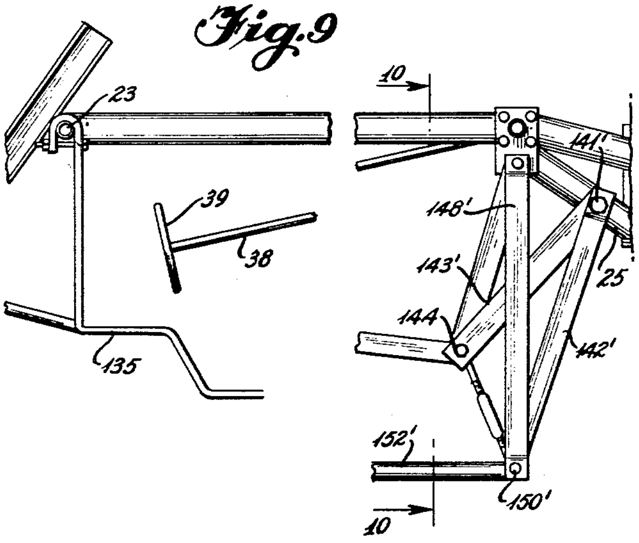
Figure 10:
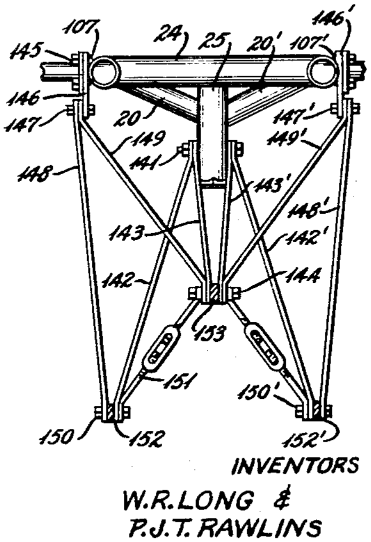
Figure 11:
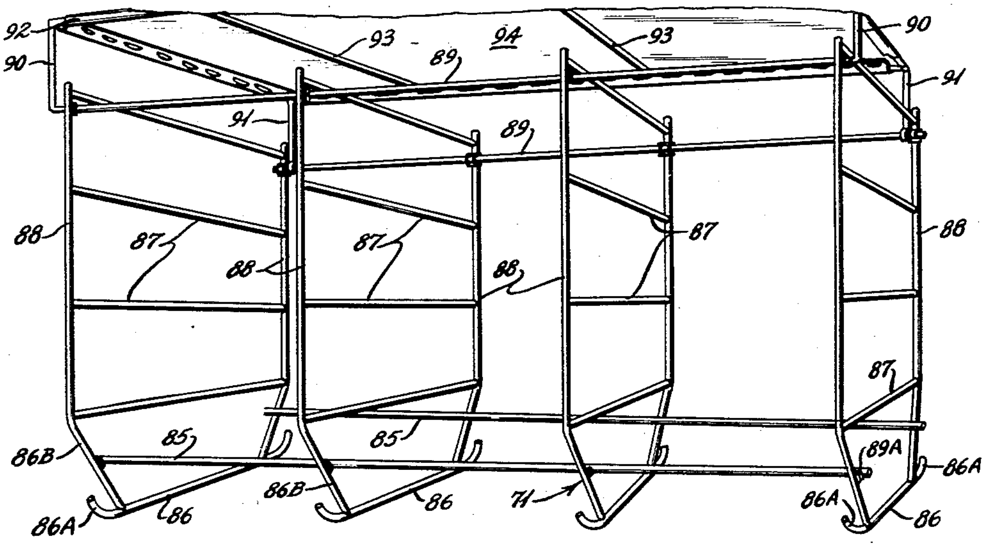
Figure 13:
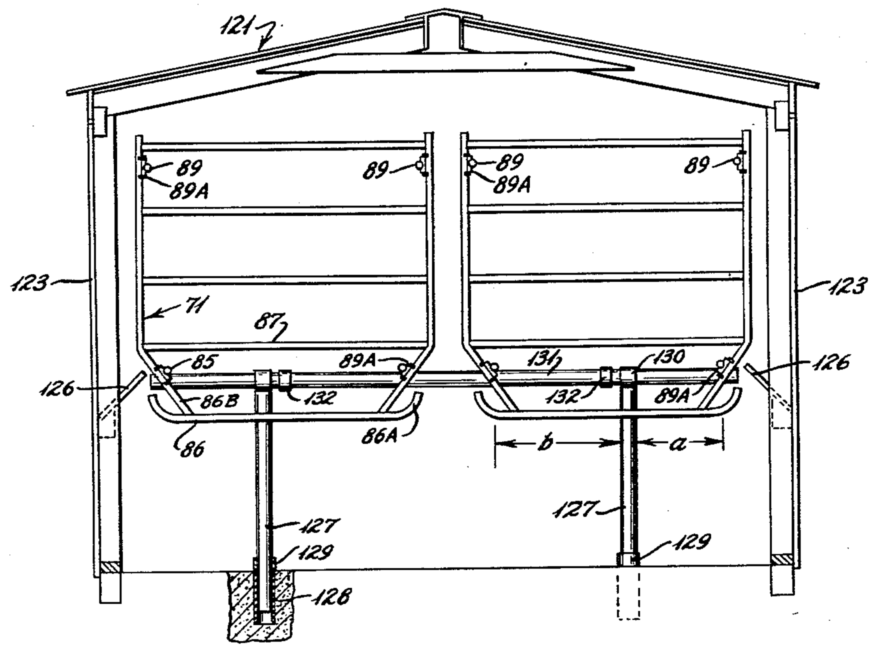
Figures 11A, 14, 15, 16:
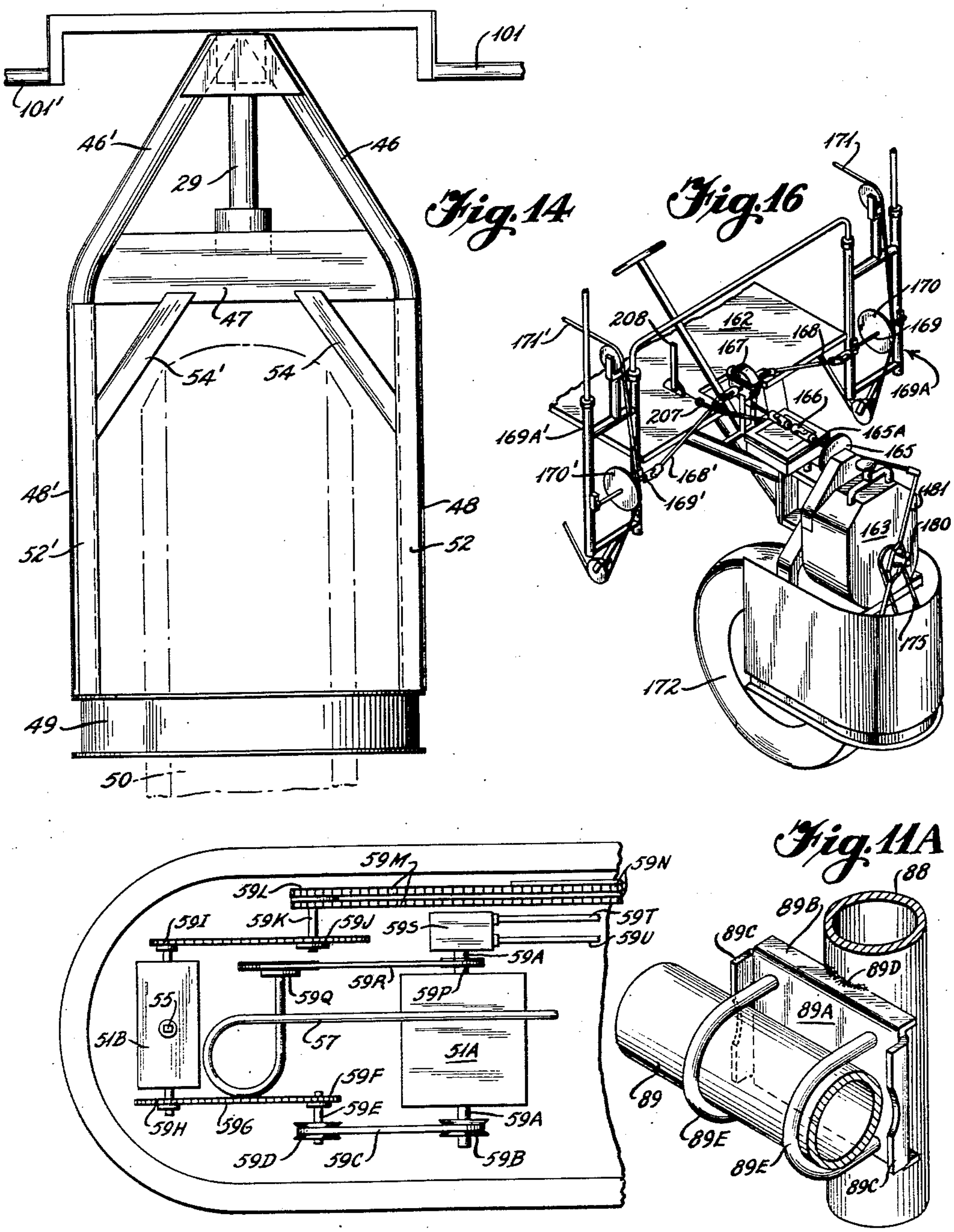

Other and further objects will be apparent as the description proceeds and upon reference to the accompanying drawing wherein:

Fig. 1 is a perspective view of the harvester according to the present invention, showing the harvester in a tobacco field with the tobacco stick receiving rack in raised position and with the rack floorboards omitted for clarity;

Fig. 2, a perspective view of a harvester which has just unloaded a filled rack of tobacco in a tobacco drying barn with parts of the barn broken away showing the interior with rack supports and heating stoves, and also showing a tobacco grading shed in the background, with a rack of filled tobacco sticks at the shed entrance permitting ready removal of the tobacco sticks prior to grading in the usual manner;

Figs. 3 and 3A are partly overlapping side elevations of the front and rear portions, respectively, of the tobacco harvester showing the conveyor chains, the fork lift elevator, and a rack thereon, the rack having the detachable workmen supporting floor boards thereon;

Fig. 4, a plan view of the harvester shown in Figs. 3 and 3A;

Fig. 5, a fragmentary enlarged detail of a portion of one of the fork lifts showing the hook for positively retaining the fork lift in raised position;

Fig. 6, an enlarged section taken on line 6—6 of Fig. 5, showing the double I-beam rail construction and the cooperating rollers supporting the lefthand fork lift;

Fig. 7, a longitudinal enlarged fragmentary section of a portion of the harvester taken substantially through the longitudinal axis of the steering fork;

Fig. 8, a fragmentary perspective showing the stripped down harvester, forming a tractor and including a three point suspension construction with hydraulic raising and lowering means for equipment such as a harrow shown in phantom lines;

Fig. 9, a fragmentary side elevation of the tractor showing the three point suspension system and a seat for supporting an operator;

Fig. 10, a transverse section taken substantially on line 10—10 of Fig. 9, showing the fixed three point support on the tractor for mounting an implement;

Fig. 11, a perspective view of the removable rack shown on the harvester of Figs. 3 and 3A, the racks being shown in the barns in Figs. 2 and 13;

Fig. 11A, a detail showing the saddle for attaching ladder-like sections of the rack to the stringers.

Figures 17, 18, 19:
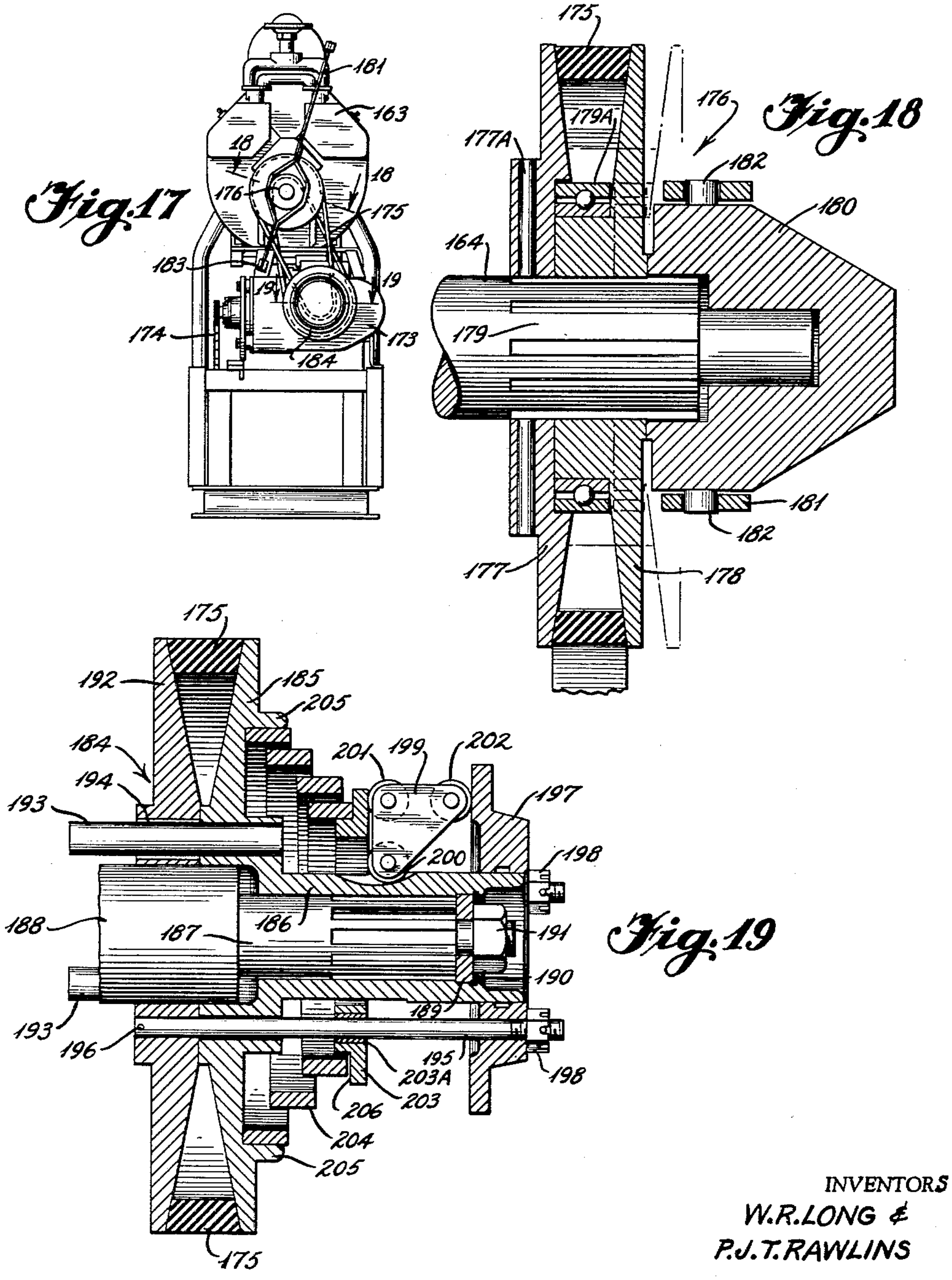

Fig. 12, a perspective of the retaining latch on the fork lift engaging the rack stringer shown fragmentarily for preventing accidental displacement of the rack while supported on the fork lift;

Fig. 13, a section of the tobacco curing barn, just inside of an end wall, taken substantially on line 13—13 of Fig. 2, showing racks supported in the barn;

Fig. 14, a front elevation of the driving wheel supporting fork showing the A frame construction;

Fig. 15, a plan schematic view of the motor and driving structure on the front fork;

Fig. 16, a fragmentary perspective of the front end portion of a modified form of harvester operated by a motor having its crank shaft extending longitudinally;

Fig. 17, a front elevation of the motor and transmission for driving the front wheel of the harvester of Fig. 16 with the guard apron omitted;

Fig. 18, a section taken substantially on line 18—18 of Fig. 17, showing the drive pulley on the motor shaft; and Fig. 19, a section taken substantially on line 19—19 of Fig. 17 and showing the driven pulley which is automatically adjustable, in accordance with the adjustment of the driving pulley for obtaining infinite variations in speed control.

Referring more specifically to the drawings, the harvester of the present invention includes a wheeled vehicle having a generally triangular framework formed of heavy tubular material with the left side of the triangle being formed of sections 20 and 21 arranged in angular relation and the right side formed of sections 20' and 21', respectively, and connected together at their forward ends to a heavy vertically extending angle member 22, forming the apex of the triangular frame, and connected at their rear ends by a transverse bar 23, forming the base of the triangular frame, a transverse brace 24 extending between and fixed to the side members at the bends therein as clearly shown in Figs. 3 and 4. A strut or brace 25 is secured at its ends to the midpoint of cross member 24 and to the bottom of angle member 22, thereby completing the main triangular framework. A plate 26 extending between the flanges of angle member 22 is welded to each of such flanges and forms with the angular member a strong tube-like construction to which a pair of heavy forwardly extending lugs 27, 28 are secured. A heavy spindle shaft 29 is rotatably mounted in a roller bearing 29A in lug 27 with lubricant sealed by a cap 29B while a roller bearing 30 in a steering gear casing 31 fixed to the lug 28 by suitable bolts or the like, rotatably supports the upper end of the spindle shaft 29, a cam sector 32 being fixed to the upper end of said spindle 29 and having roller studs 33 cooperating with a worm 34 fixed on a shaft 35 rotatably mounted in the gear housing 31, said shaft 35 extending out of the gear housing and being connected by a universal joint 36 to an intermediate shaft 37 which is connected by another universal joint 36A to a steering shaft 38 to which a steering wheel 39 is fixed for rotating the spindle 29 at least 180°.

An A-shaped steering fork is provided comprising a pair of forwardly extending arms 40, 41, having semi-circular recesses embracing shaft 29, are fixedly secured thereto by caps 42, 43, respectively, having cooperating semi-circular recesses embracing the shaft 29, the caps being held in place by means of a plurality of bolts 44, and relative movement of the arms with respect to the shaft being prevented by keys 45, 45' extending into recesses in the shaft and arms. A pair of downwardly extending and diverging channel member sections 46, 46' fixed at their upper ends to arm 41 are connected at their lower ends by a tubular brace 47 and continuing downwardly from the lower ends of channel sections 46, 46' are channel sections 48, 48' which project to and are fixed to legs 49, 49' of a channel member bent into U-shape and embracing a traction wheel 50 which is mounted for rotation about an axis 51 in suitable bearings on rearward extensions of the legs 49, 49', the axis 51 being directly below the axis of spindle 29. Suitable bracing struts 52, 52' and gusset plates 53, 53' extending between the forward and rear portions of legs 49, 49', respectively, of the U-shaped member, and the channel sections 48, 48' transmit the load from the traction wheel to the supporting frame. Diagonal braces 54, 54' prevent lateral bending of the traction wheel supporting frame.

The drive for the traction wheel 50 is similar to that disclosed in the Long patent but the change speed and reversing transmission is mounted forwardly on the traction wheel supporting frame, so that the weight of the motor and transmission provide a large part of the force produced in the driving of the traction wheel, reducing the strain on the spindle 29 and the main frame. A traction force of 2160 lbs. is an example of the available power. It will be noted that the power mechanism including a motor 51A and a transmission 51B is located below the floor of the harvester, so that a turn of at least 90° may be made in each direction by the combination steering and traction wheel 50 whereby a turn of minimum radius can be made by the harvester about a center substantially midway between the rear wheels. By the use of reverse the turning can be done in limited space. A transmission gear shifting lever 55 extends from the transmission 51B located at the extreme forward position on the traction wheel supporting frame, the transmission 51B being hidden from view by a housing 56 which surrounds the operating mechanism and includes a ballast receiving compartment similar to that of the prior patent.

An advantage of the present arrangement of the traction wheel supporting frame is that the wheel may be angularly turned in steering while the harvester is stationary without changing the position of the harvester, and an additional advantage is the reduction of the manual effort involved.

A power take-off similar to that disclosed in the Long patent is provided from the motor and may include a flexible shaft 57 or the equivalent such as a flexible shaft formed by a plurality of universal joints and such shaft carries power to a worm and worm gear in a conventional gear housing 58 suitably fixed to the main tubular frame in a suitable manner for driving a conveyor driving shaft having sections 59, 59' on the left and right sides, rotatably mounted in suitable bearings on the harvester frame.

Referring to Fig. 15, the drive from the motor 51A to the various parts includes the crankshaft 59A carrying an adjustable pulley 59B which drives through a V belt 59C, a second adjustable pulley 59D which rotates a shaft 59E carrying a sprocket 59F which carries power through a chain 59G to a sprocket 59H on the transmission 51B. The transmission 51B includes a conventional three speed forward and one speed reverse and drives a small sprocket 59I which through a chain drives a large sprocket 59J on a shaft 59K which shaft 59K carries a pair of small sprockets 59L, 59L, which are fixed to rotate with sprocket 59J. Sprockets 59L, 59L by means of chains 59M, 59M drive large sprockets 59N, 59N fixed to the traction wheel 50 thereby completing the drive. It will be evident that the adjustable pulleys 59B and 59D are similar to corresponding parts of the Long patent and provide the clutch and also provide an infinitely variable speed control which along with the transmission 51B provides extreme variations in speed and power to the driving wheel. The power take-off shaft 57 is driven from the other end of the crankshaft 59A by means of a pulley 59P which drives a pulley 59Q by means of a belt 59R, the pulley 59Q being connected to and driving the flexible power take-off shaft 57.

A hydraulic pump 59S is driven from the right end of motor shaft 59A and supplies hydraulic fluid under pressure through a line 59T and obtains hydraulic fluid from a line 59U.

A pair of downwardly and rearwardly depending parallel tracks 60, 60' are fixed intermediate their ends to the rear ends of heavy tubular frame sections 21, 21', respectively, by welding or the like, suitable bracing (not shown for simplicity) being provided to effectively and strongly support such depending tracks. Each track is preferably formed of two juxtaposed I-beams 60A, 60B, welded together on their adjacent flanges and providing outwardly opening channel shaped tracks at each edge. Such channel shaped tracks receiving rollers 61, 61A, mounted in a pair of angle members 62, 62A, welded together on one of their flanges and having stub shafts extending inwardly and supporting the rollers 61, 61A in operative positions. A plurality of rollers being provided along the lengths of angle members 62, three being shown, one at the top and bottom and one intermediate. The top and intermediate rollers 61, 61A have their stub shafts projecting into openings in U-shaped brace members having legs 63, 63A and a connecting rod 64, thereby providing additional support for the stub shafts and the rollers 61, 61A, the intermediate U-shaped member having a laterally extending eye 65 for receiving a lifting cable 66, the eye 65 being strengthened by a brace 67 or the like. The uppermost rod 64 may be engaged by an L-shaped latch member 68, connected by pivot 69 to the upper end of the corresponding track 60 or 60'. Extending horizontally from the angle members 62, 62A are the tine lift members 70, 70' forming the fork lift which supports a tobacco stick rack 71 in operative position.

Extending downwardly from intermediate points on the tracks 60, 60' are legs 72, 72' and extending laterally and forwardly from the lower ends of the tracks 60, 60' are braces 73, 73', the legs 72, 72' and braces 73, 73' respectively being connected together and supporting stub shafts 74, 74' which rotatably support wheels 75, 75', thereby providing a three wheel vehicle. Suitable brakes (not shown) are mounted on the harvester and operate on drums 75A, 75A' formed by cast iron hubs on the wheels 75, 75' each hub weighing approximately 75 lbs., thereby increasing the stability of the harvester.

For raising and lowering the fork lifts 70, 70' a transversely extending shaft 76 is rotatably mounted in suitable bearings in the rear of the main triangular frame and carries bent arms 77, 77', keyed or otherwise fixed to the left and right end, respectively, of the shaft 76 for simultaneous operation. Hydraulic cylinders 78, 78' pivotally mounted at their lower ends on brackets 79, 79' fixed to intermediate locations on the tracks 60 and 60', respectively, operate piston rods 80, 80' pivotally connected to spaced webs 81 on one side of the arms 77, 77', hydraulic fluid being supplied to the cylinders 78, 78' by suitable lines 82, 83 and 82', 83', respectively. In the outer ends of arms 77, 77' slots are formed and pulleys 84, 84' respectively are rotatably mounted in the slots and cables 66, 66' pass over such pulleys one end of each cable being secured to the corresponding eye 65 or 65' on the extensions of rods 64 or 64' respectively of the intermediate U-shaped reinforcing element on the fork lift (Fig. 5) the other ends of cables 66, 66' being secured to the brackets 79, 79', respectively.

Hydraulic fluid under pressure is delivered to a valve 84A through supply conduit 59T, the valve 84A having branches 82 and 83 to which are connected hydraulic lines 82' and 83', respectively, to carry hydraulic fluid to and from hydraulic cylinders 78, 78', the return hydraulic fluid being collected in the sump 84B and returned through line 59U to the pump 59S, the lines 59T and 59U passing close to the pivot spindle 29 to avoid any strains from the steering operation. An operating lever 84C extends from the valve 84A and permits the operator to control the hydraulic lift. It will be evident that the operator has the necessary controls for the brakes, starter, ignition, etc. easily available adjacent the steering wheel 39, and gear shift lever 55 may be shifted by the operator as required.

The operation of the fork lift comprising tines 70, 70' is believed to be apparent, the full line showing (Fig. 3A) indicating the position for passing through a field and carrying a rack 71, the dotted line shown indicating the lowermost position for setting the rack on the ground, the latches 68, 68' serving to positively assure that the fork lift is retained in its fully raised position even though the hydraulic system should fail.

The rack 71 clearly shown in Figs. 3A, 11 and 13 includes a pair of tubular front and rear laterally extending stringers 85, 85 from which four upstanding ladder-like frames are secured in equally spaced parallel transverse relation, the bottom section of each ladder-like section being in the form of an inverted trapezoid, each ladder-like frame including a bottom rung 86 providing the short base of the trapezoid and having outwardly projecting curved ends 86A, 86A providing skids. The inclined sides 86B, 86B of the trapezoid extend to the first rung 87, and to the associated upright 88. The upper ends of the ladder-like frames are secured to elongated tubular frame members 89, 89, the frame members 89, 89 and stringers 85, 85 being detachably secured to the ladder-like frames by saddles 89A welded to the inclined sides 86A and uprights 88 respectively.

The saddle 89A is formed from a plate of sheet metal having side flanges 89B, 89B projecting from opposite sides thereof in one direction and end flanges 89C, 89C projecting from the plate in the opposite direction and at the ends thereof, each of the flanges 89B, 89B being cut out for receiving and partially embracing the upright 88 to which it is secured by welding 89D or the like and the longitudinal stringers 85 or tubular members 89 being embracingly received in the arcuate cutouts in the flanges 89C, 89C, such stringers or tubular members are retained by U bolts 89E, 89E having the usual nuts by means of which U bolts and nuts, the stringers 85 and the tubular members 89 are maintained in fixed relation during the use of the rack permitting ready disassembly of the rack for storage or the like. The ends of the tubular members 89, 89 are open for receiving a top including a detachable supporting frame having a covering to protect the tobacco from sun and rain. Such top supporting frame including front uprights 90 and rear uprights 91, with a plurality of longitudinal stringers 92 and a plurality of transverse members 93, carries a tarpaulin 94 or the like secured in a suitable manner, said top serving to shade the tobacco from the sun and rain and being removable when the racks are placed in a barn. The rack is retained on the fork lift 90 by a spring pressed hand-operated latch 95, on each tine 70 and 70' and shown in operative position in Fig. 12.

The rack 71 is shown as being made with three rooms or compartments to receive tobacco sticks but the number of rooms may be varied to one or two. Suitable stops are provided on the stringers 85 to cooperate with the tines 70 or 70' to prevent lateral shifting of the rack on the harvester in the use of the harvester on rough terrain. The downwardly projecting portion of the ladder sections also would limit any lateral displacement of the racks relative to the tines 70 or 70'.

Removably secured to the sides of the framework of the harvester including the triangular main frame and the downwardly and rearwardly dependent tracks 60, 60' are a pair of conveyor carrying and worker supporting frameworks 97, 97' which carry conveyor chains 98, having tobacco engaging clips 99 pivotally connected to the chains with adjacent clips on alternate sides thereof in the manner shown in the Long patent.

The main triangular shaped frame of the harvester is covered by a floor 100, supported on the triangular framework and upon front laterally extending tubular elements 101, 101' and secured to the framework in any suitable manner, other frame members such as tubular element 102, 102' adding to the rigidity of the floor support. A transverse angle member 103 extending between and secured to transverse tubular members 101, 101, provide a front transverse member, the angular member 103 forming a raised step which provides space for the steering gear box 31. A removable floor plate 104 overlies the gear box and is spaced above the floor 100. Since the side frames 97, 97' are similarly attached only the left side framework 97 will be described in detail.

A tubular member 105 at the front of the framework 97 telescopes into tubular member 101 being retained by a clamp 105A. A face plate 106 on a laterally extending element 106A is secured by bolts to a boss or rest 107 on the main frame and another face plate 108 on an inwardly extending frame element 108A is similarly secured to a boss 109 by suitable bolts. A face plate 110 on the rear of the removable framework 97 is secured to the track 60 by removable bolts. The framework 97′ is similarly supported and both side frameworks may be removed by loosening the clamp 105A and removing the bolts from the face plates and bodily separating the frameworks 97, 97′ as complete units from the harvester main frame for conversion into a tractor. At the top of the framework 97 a walk 111 is secured which permits an operator to stand on the outboard side of the conveyor chain for the purpose of removing tobacco and placing the same on tobacco drying sticks, the walks 111 increasing the space sufficiently to permit additional help where necessary.

The conveyor chains are mounted on sprockets carried by struts extending from the side framework members 105 and intermediate framework member 112 and the rear framework member 113. The members 112 and 113 are connected together by longitudinal members 114, 114A, 114B. The conveyor chains are driven by sprockets 116, 116′ on stub shafts 115, 115′ which stub shafts are rotatably supported in bearings on longitudinal members 114, 114A, the stub shafts 115, 115′ being connected by suitable spline connections 117 to the conveyor driving shaft sections 59, 59′ so that upon removal of the side frameworks 97 the spline connection will permit detachment and there will be no projection beyond the floor 100 after removal of the framework, thereby substantially reducing the width dimension of the tractor. One or more adjustable seats 118 are provided on each framework for supporting the workmen and suitable adjustable foot rests 118A are also provided as required.

Assuming that the harvester has been run through the field and sticks of tobacco have been filled in a manner similar to that described in the Long patent, such filled sticks are placed on the removable racks 71, removable floor boards 119 being supported on the stringers 85, 85 to fill the space between the ladder-like frames, such floor boards having transverse cleats 120 for positively preventing the floor boards from sliding off stringers 85, 85, the floor boards being short enough to avoid interference with the raising and lowering of the fork lift 70, 70′. It is evident that the workers may carry the filled sticks of tobacco from stick supports 120A, 120B on the harvester to the rack 71 and place the filled sticks between corresponding rungs of adjacent ladder-like frames until the rack is completely filled. Four sets of stick supports 120A, 120B may be provided so four operatives or loopers may work simultaneously.

When the rack 71 is filled, the harvester carrying the filled rack is driven to a tobacco drying barn 121 (Figs. 1 and 13) and the rear wheels of the tractor are guided into tracks or ruts 122 which are in alignment with an opening in the side of the barn so arranged as to permit the rack 71 to pass through the opening. The opening in the barn is closed and sealed by doors 123 hingedly mounted on the upright supporting posts of the barn. The upright supporting posts of the barn may be fixed in the ground by setting the posts in holes similar to the way telephone poles are set, for providing secure anchorage and to assist in lateral bracing of the barn. The floor of the barn may be a conventional earth floor or may be of wood, metal, concrete or the like.

Two pairs of doors 123 are provided on each side of the tobacco drying barn, so that the racks 71 may be placed in the barn from any of four different positions, it being evident that the barns may be made larger or smaller as desired. The barns are heated by conventional oil heating stoves 124, the products of combustion being carried out through flues 125 extending through the roof. The barn is sealed in accordance with conventional practice and removable baffles 126 are provided in the sides and ends, as well as in the middle, so as to cause the heated air to pass through the tobacco in the racks, suitable supports, such as cleats or brackets, providing for removal of the baffles adjacent to the doors.

A plurality of posts 127 are removably supported in upright position in sockets 128 imbedded in a suitable concrete base to prevent settling, the posts being supported at the upper ends of the sockets 128 by collars 129 fixed to the posts 127 thereby limiting the lowermost position of the posts. The upper end of each post is provided with an eye which may be in the form of a conventional T pipe fitting 130 which loosely receives tubular beams 131. The beams 131 are provided with collars 132, 132, which limit endwise movement of the beam 131 because of the collars 132 engaging the adjacent T 130. The racks 71 are supported on tubular beams 131 by positioning stringers 85 so that the distance (*a*) is substantially twice the distance (*b*) thereby taking advantage of the continuous beam action of beam 131 and reducing the number of supporting posts 127 with attendant economy of initial cost and installation while permitting assembly without tools so the parts are positively retained in assembled position of use.

It should be apparent that the harvester after having its rack 71 filled will be backed toward the barn 121 with the rack 71 lowered to a position to pass through the opening of the barn so that the stringers 85, 85 are above the beams 131 and the harvester is backed so the rack 71 is located in the barn and by lowering fork 70, 70′ the filled rack is deposited on the adjacent pair of supporting beams 131, the harvester thereafter being returned to the field for the next load. Similarly, three other racks are placed in the barn and the drying process started while the harvester may be used for any other purposes in the meantime, such as for transferring cured tobacco from the other drying barns 121 to a grading shed 133, a dried and filled rack of tobacco being shown on the loading platform 134 at the entrance of the shed 133. The rack may be placed on the loading platform by the fork lift and the tobacco removed therefrom for grading in any suitable manner, and after removal of the tobacco the rack may be re-used in the field. The temporary covering over the racks will, of course, be removed before the racks are placed in the drying barns and such temporary covering may be used on other racks and similarly the floor boards 119 may be used on other racks so that one top cover and one set of three floor boards 119 may be sufficient for one harvester.

It is believed that the advantages of the present invention when the harvester is used for tobacco should be apparent from the above description; however, some of the advantages may be described and particularly the rapid placing of the tobacco in the tobacco curing barn. With the present invention, it is necessary to keep the doors of the tobacco barn open for only a minimum period of time and the heat may be retained within the tobacco barn without excessive ventilation since the workmen do not have to do any of the work within the tobacco barn, the fork lift performing all of the loading and unloading functions. Further, because of the increased speed of loading the barn the curing process is speeded up by a day or more for each cure, resulting in more economical use of the barn for curing processes.

After the tobacco season is over, the barn may be used for conventional storage, including storage of the harvester of the present invention. This is accomplished by removing the racks 71, the supporting beams 131 and posts 127, as well as the stoves 124 from the ends of the barn. The stoves 124 in the center of the barn may also be removed or may be left in place for heating the barn in the winter. The barn in heated or unheated condition may be used as a chicken coop, a work shop, or the like. As a result, an overall economy in farm operation is obtained by the use of the present invention, including the method and equipment disclosed.

*The tractor*

Referring more particularly to Figs. 8 to 10, inclusive, the harvester has been stripped down by removing the side frameworks 97, 97', with conveyors thereon, while the steering column 38 with the steering wheel 39 is brought down below the triangular framework, so that the wheel is adjacent a seat 135 suspended from the rear transverse member 23 and braced from the tracks 60, 60' by struts 136, 136' extending from the seat and having face plates 137, 137' at their outer ends secured to the tracks 60, 60'. It will be evident that the operator may sit in the seat 135 and control the operation of the tractor as suitable controls are extended to a position adjacent seat 135. If desired, the seat 135 may be positioned off-center and supported in a suitable manner from the main frame, thereby making it possible for the operator to obtain proper view of the path over which the tractor is to be guided. The seat 135 may be adjusted vertically and laterally by providing suitable adjustable telescopic struts 136 and telescopic upright supports 138, 138', which are hooked over the transverse bar 23 of the main frame.

The tractor is designed to produce a pulling thrust of 2100 lbs. and such pulling thrust may be used for drawing any type of load. The tractor may be used with the fork lifts 70, 70' or such fork lifts may be removed when the tractor is used for pulling only. When used as a fork lift the operator may stand on the floor 100 or sit on a seat above the floor, if desired.

The tractor may be used as a conventional tractor for drawing farm implements, such as a harrow, 139, which is supported by a three point suspension system similar to that of the "Ford" or "Ferguson" system. The three point support is provided by three inverted tripods suspended from the main triangular frame. The strut or brace 25 of the main frame which extends from transverse brace 24 to the upstanding angle member 22 is provided with a transversely extending aperture 140 therethru for receiving an anchor bolt 141 from which legs 142, 142' and 143, 143' extend, the lower ends of legs 143, 143' being connected together by a bolt 144. Secured by means of bolts 145 to the seats 107, 107' are anchor plates 146, 146', the lower ends to such anchor plates having bolts 147, 147' passing therethru and through the upper ends of four depending legs 148, 148' and 149, 149' for suspendingly supporting such legs, the legs 149, 149' having their lower ends connected to the lower ends of legs 143, 143' by means of the bolt 144, with one tripod being formed by legs 149, 149', a double leg formed by legs 143, 143' thereby providing a rigid support for bolt 144.

The lower ends of legs 148 and 142 are connected together by bolt 150 and the lower ends of legs 142' and 148' are connected together by means of a bolt 150'. From the bolts 150, 150' extend adjustable turnbuckles 151, 151', respectively, having their other ends connected to bolt 144, thereby providing a tripod support for bolts 150, 150', respectively. As a result, it will be evident that a rigid support of three fixed points is obtained by means of the depending legs and turnbuckles, the three fixed points being the bolts 150, 150' and 144.

Rearwardly extending links or draw bars 152, 152' are pivoted to bolts 150, 150', respectively, and a link 153 is pivoted to bolt 144, said links 152, 152' and 153 extending rearwardly in spaced relation, the rear ends of links 152, 152' being connected by bolts 154, 154' to attaching lugs on the harrow 139, while the link 153 is pivotally connected by means of a bolt 155 to the upper end of a pyramidal skeleton framework formed of a plurality of downwardly extending diverging legs 156, 156', 157, 157', such legs being connected at their lower ends to lugs on the harrow 139. Bolts 154, 154' may serve to attach the lower ends of legs 156, 156' to lugs on the harrow 139, and bolts 158, 158' may serve to attach the lower ends of legs 157, 157' to other lugs on the harrow.

For raising and lowering the harrow, a pair of links 159, 159' are connected at their lower ends by means of pivot pins or bolts 160, 160' to intermediate points on links 152, 152', the upper ends of such links 159, 159' being connected to the outer ends of lifting arms 77, 77', respectively. The pulleys at the outer ends of such lifting arms have been removed and a pivot pin or bolt 161 substituted therefor for pivotally connecting the corresponding link 159 to such arm 77. The arms 77, 77' as shown in Figs. 3A and 4 have been disconnected from piston rods 80, 80' and the arms rotated to the position shown in Fig. 8, in which position the piston rods 80, 80' have been connected to the outer pair of spaced webs 162, 162' so that hydraulic fluid may operate cylinders 78, 78' and piston rods 80, 80' for raising and lowering the rearwardly extending ends of links 152, 152', thereby raising or lowering the harrow 139. It will be evident that a suitable connection, such as a turnbuckle, or the like, may be included in one or both of links 159, 159' to obtain proper inclination of the harrow 139 or other piece of equipment.

From the above description, the operation of the tractor is believed to be evident and the simplicity of the combination harvester and tractor for accomplishing other work, including use as a fork lift for handling heavy objects, can be had with a minimum of delay and effort in changing over from one to the other.

Referring to Figs. 16–19 inclusive, a modified form of harvester is shown in which the floor 162 does not extend as far forwardly on the triangular shaped frame as in the previous modification. The driving motor 163 has its crankshaft 164 extending longitudinally with a belt drive from the rear end of the crankshaft to a pulley 165 which is connected to a shaft 165A and by means of universal joints 166, 166 drives a worm gear in a gear housing 167 which drives laterally extending shafts 168, 168' which through suitable universal joints and spline connections drives stub shafts 169, 169' on detachable frames 169A, 169A' which stub shafts carry sprockets 170, 170' which drive conveyor chains 171, 171' which conveyor chains correspond to the conveyor chains 98 in the previous modification. A traction wheel 172 rotatably mounted on a steering fork is driven by means of a transmission 173 and driving chains 174 power being supplied to the transmission from motor 163 by means of a belt 175 which is reaved over an adjustable split pulley 176 mounted on the front end of crankshaft 164. The pulley includes a flange 177 fixed to crankshaft 164 by a taper pin 177A and a slidable flange 178 having its hub splined on splines 179 of shaft 164 permitting relative axial movement between flange 178 and flange 177 while preventing relative rotary movement.

The pulley 176 also serves as the clutch for the running gear the clutch being released by separating the flange 178 to its maximum position from flange 177 so that the belt 175 freely rides on the outer race of an anti-friction roller 179A. The flange 178 may be moved inwardly by means of a thrust bearing 180 which is controlled in its movement by a speed control lever 181 having yoke portions which engage pivot elements 182, 182, on the thrust bearing 180, the lower end of the lever 181 being pivotally connected to a lug 183 secured to the motor by any suitable means.

The belt 175 drives a pulley 184 mounted on the power-receiving shaft 188 of the transmission 173. The pulley 184 includes a flange 185 having an internally splined hub 186 mounted on a reduced end portion 187 of the transmission shaft 188 and such hub 186 with the flange 185 is fixed against endwise movement by a washer 189 held in position by a split ring 190 received in an annular groove in the hub 186 while a nut 191 is screwed onto a threaded end portion of the transmission shaft 188 whereby the flange 185 is prevented from relative movement with respect to the shaft 188. A movable flange 192 is slideably mounted on a plurality of pins 193 fixed to the flange 185 and projecting through flange 192, suitable bearing sleeves 194 being provided in the flange 192 to reduce friction during such movement. A plurality of threaded rods 195 are fixed on their inner ends to the movable flange 192 by any suitable means such as taper pins 196, the other ends of said threaded rods 195 passing through a ring 197 slideable on the outer surface of the hub portion 186 of the fixed flange, the spacing of the ring 197 being controlled by the adjustment of nuts 198.

A plurality of triangular levers 199 are each pivotally mounted at one apex on a lug 200 and each triangular lever has rollers 201, 202 at the other apexes. The rollers 201 contact a ring 203 which ring is slideably mounted by means of bushings 203A on rod 195 and reacts against a spiral spring 204 maintained in position by an annular ridge 205 on the fixed flange 185 and by the rabbet groove 206 in the ring 203.

From the above description, it will be apparent that the motor 163 drives the pulley 175 and the position of the speed control lever 181 as controlled by the operator of the harvester through the Bowden wire connection 207 and hand lever 208 provides complete control over the driving of the wheel 172. The separation of the flange 178 from the flange 177 allows the belt 175 to rest on the roller 179 and with flanges 177 and 178 separated the inner race of the anti-friction roller 179A may rotate with the motor shaft 164 while the belt 175 remains stationary. When it is desired to drive the harvester, the hand lever 208 is moved to cause flange 178 to move from the dotted line position shown in Fig. 18 to the full line position thereby causing the belt 175 to be frictionally engaged by the flanges 177 and 178 causing the belt to move and such belt 175 causes rotation of pulley 184 and the transmission shaft 188 driven therefrom. When flange 178 is moved toward flange 177 the belt 175 is moved toward the periphery of the pulley 176. Since the belt does not stretch the portion of belt 175 in pulley 184 moves toward the center or hub of the pulley 184, thereby automatically separating the flanges 192 and 185 and compressing the spring 204 simultaneously therewith causing ring 197 to press against the rollers 192 of the triangular levers 199 thereby urging the roller 201 against the ring 203 resulting in the compression of the spring 204. It will be noted that from the shape of the triangular lever 199 the mechanical advantage of the lever 199 compensates at least in part for the additional resistance in the compression of spring 204 avoiding unnecessary pressure and wear on the belt 175 by maintaining a constant frictional force in accordance with the power requirements of the harvester.

From the above description, the operation of the tractor and the speed control are believed to be apparent but it is to be understood that the rear wheel of the truck may be positively rotated and a suitable drive for such rear wheel could be obtained through the universal joints 166 and a differential gear unit which would drive chains for operating the rear wheels thereby providing a drive on each ground engaging wheel.

It will therefore be evident that the present invention provides equipment of general utility which may be used throughout the year and the harvester may be used for other products than tobacco, with workers sitting on seats on the side frameworks 97, 97', or such workers may be suppored on the elevators 70, 70', thereby increasing the number of workers that may be carried by the machine. Also, the elevator may be used to carry workers from the ground to the worker supporting platform on the harvester thereby making it possible for women and elderly people to be used in the work with resulting increase in efficiency and permitting the use of people with less strength than has been required heretofore.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. Apparatus for use in harvesting and drying tobacco comprising a mobile device adapted to be operated through a field of tobacco, said mobile device having spaced ground engaging elements for supporting the same and having an operator supporting means adjacent the ground on at least one side of the mobile device, conveyor means on said mobile device extending from a position adjacent the operator supporting means to an elevated discharge position, a vertically movable adjustably mounted storage device support, a storage device removably mounted on said storage device support and having a portion located adjacent the elevated discharge position of the conveyor means whereby tobacco leaves picked by the operator may be placed on the conveyor means and transferred from the discharge position of the conveyor means and placed on the storage device.

2. The invention according to claim 1 in which the storage device includes a rack having vertically and horizontally spaced supporting members for receiving the opposite ends of sticks filled with tobacco whereby the tobacco may be removed from the conveyor means at the discharge position, placed on sticks and the sticks placed on the storage device thereby reducing the manual handling.

References Cited in the file of this patent

UNITED STATES PATENTS

| | | |
|---|---|---|
| 425,696 | Power et al. | Apr. 15, 1890 |
| 497,687 | Rogers | May 16, 1893 |
| 1,959,454 | Biescar | May 22, 1934 |
| 2,043,032 | Brasfield | June 2, 1936 |
| 2,369,436 | Court | Feb. 13, 1945 |
| 2,410,918 | Acton | Nov. 12, 1946 |
| 2,491,044 | Holland | Dec. 13, 1949 |
| 2,504,403 | Finley | Apr. 18, 1950 |
| 2,518,965 | Whitley | Aug. 15, 1950 |
| 2,644,540 | Balzer | July 7, 1953 |
| 2,650,104 | Grace | Aug. 25, 1953 |
| 2,675,136 | Spikes | Apr. 13, 1954 |
| 2,702,134 | Alphin | Feb. 15, 1955 |
| 2,703,986 | McClelland | Mar. 15, 1955 |
| 2,704,158 | Long | Mar. 15, 1955 |
| 2,712,391 | Jones | July 5, 1955 |
| 2,735,308 | Peterson | Feb. 21, 1956 |
| 2,754,020 | Dunn et al. | July 10, 1956 |